(12) United States Patent
Bettin (10) Patent No.: US 9,481,419 B2
(45) Date of Patent: Nov. 1, 2016

(54) BICYCLE

(71) Applicant: Karsten Bettin, Hannover (DE)

(72) Inventor: Karsten Bettin, Hannover (DE)

( * ) Notice: Subject to any disclaimer, the term of this patent is extended or adjusted under 35 U.S.C. 154(b) by 0 days.

(21) Appl. No.: 14/418,933

(22) PCT Filed: Apr. 20, 2013

(86) PCT No.: PCT/DE2013/100146
§ 371 (c)(1),
(2) Date: Jan. 31, 2015

(87) PCT Pub. No.: WO2014/023291
PCT Pub. Date: Feb. 13, 2014

(65) Prior Publication Data
US 2015/0232141 A1    Aug. 20, 2015

(30) Foreign Application Priority Data

Aug. 8, 2012 (DE) .................. 10 2012 107 253

(51) Int. Cl.
*B62J 1/00* (2006.01)
*B62K 3/02* (2006.01)
*B62K 15/00* (2006.01)
(Continued)

(52) U.S. Cl.
CPC .............. *B62J 1/007* (2013.01); *B62K 3/02* (2013.01); *B62K 15/006* (2013.01); *B62K 21/02* (2013.01); *B62K 21/16* (2013.01)

(58) Field of Classification Search
CPC ...... B62J 1/007; B62K 15/006; B62K 21/02; B62K 21/16; B62K 3/02
See application file for complete search history.

(56) References Cited

U.S. PATENT DOCUMENTS

| 1,381,281 A | 6/1921 | Haskell |
| 3,979,136 A | 9/1976 | Lassiere |
| 4,598,923 A | 7/1986 | Csizmadia |

(Continued)

FOREIGN PATENT DOCUMENTS

| CN | 2182139 | 11/1994 |
| CN | 200992274 | 12/2007 |

(Continued)

OTHER PUBLICATIONS

JMGobillard, MicroSlider 02, "The MicroSlider in action". Video uploaded to Youtube on Feb. 3, 2008 and retrieved from http://www.youtube.com/watch?v=LUevhv0hhZw on Apr. 22, 2014.

(Continued)

*Primary Examiner* — Kevin Hurley
*Assistant Examiner* — Gabriela C Craciun
(74) *Attorney, Agent, or Firm* — Smartpat PLC (57) ABSTRACT

The invention relates to a bicycle, with a bicycle seat assembly rotatably connected to the bicycle. Rotation movement of the bicycle seat assembly is possible, seen in the driving direction, to the left and to the right side and is independent of the steering movement of the bicycle. The axis of rotation of the bicycle seat assembly is arranged in front of the axis of the bottom bracket, seen in the driving direction, and the seating surface of the bicycle seat is arranged behind the axis of the bottom bracket, seen in the driving direction. The rotatable bicycle seat assembly enables an upright riding position by dodging the cyclist's leg pedaling downwards through a rotational movement. At the same time it supports the hip side of the other leg. The driver is supported by the bicycle seat even in the upright riding position.

20 Claims, 10 Drawing Sheets

(51) Int. Cl.
 *B62K 21/16* (2006.01)
 *B62K 21/02* (2006.01)

(56) References Cited

U.S. PATENT DOCUMENTS

| | | | | |
|---|---|---|---|---|
| 4,925,203 A * | 5/1990 | Buckler | ............... | B62K 3/02 280/278 |
| 5,011,222 A * | 4/1991 | Yates | ............... | B62J 1/18 297/214 |
| 5,076,642 A * | 12/1991 | Beylet | ............... | B62J 1/18 297/214 |
| 5,328,194 A * | 7/1994 | Buckler | ............... | B62K 3/005 280/202 |
| 5,899,481 A * | 5/1999 | Ferrarin | ............... | B62K 15/006 280/287 |
| 6,206,387 B1 * | 3/2001 | Tsai | ............... | B62K 3/002 16/359 |
| 6,302,480 B1 * | 10/2001 | Hall | ............... | B62J 1/002 297/195.1 |
| 6,336,649 B1 * | 1/2002 | Lin | ............... | B62H 1/02 224/418 |
| 7,510,202 B1 * | 3/2009 | Shiao | ............... | B62K 15/006 280/278 |
| 2002/0117880 A1 * | 8/2002 | Ladson, III | ............... | B62J 1/007 297/201 |
| 2004/0004341 A1 | 1/2004 | Carr et al. | | |
| 2004/0245743 A1 * | 12/2004 | Chao | ............... | B62K 3/10 280/278 |
| 2005/0001404 A1 * | 1/2005 | Mihelic | ............... | B62K 13/02 280/278 |
| 2005/0230933 A1 * | 10/2005 | Woo | ............... | B62K 15/008 280/278 |
| 2005/0263979 A1 * | 12/2005 | Sinclair | ............... | B62K 15/006 280/278 |
| 2005/0285366 A1 * | 12/2005 | Huang | ............... | B62K 15/006 280/278 |
| 2006/0175797 A1 * | 8/2006 | Sanders | ............... | B62K 15/006 280/287 |
| 2007/0200399 A1 * | 8/2007 | Riondato | ............... | B62J 1/007 297/202 |
| 2007/0210556 A1 * | 9/2007 | Hon | ............... | B62K 15/008 280/287 |
| 2007/0290479 A1 * | 12/2007 | Tong | ............... | B62K 15/008 280/278 |
| 2008/0054689 A1 | 3/2008 | Tucker | | |
| 2008/0116659 A1 * | 5/2008 | Seaman | ............... | B62K 15/006 280/278 |
| 2008/0224441 A1 * | 9/2008 | Lu | ............... | B62K 15/006 280/278 |
| 2009/0014981 A1 * | 1/2009 | Perry | ............... | B62K 3/02 280/281.1 |
| 2010/0045084 A1 * | 2/2010 | Segato | ............... | B62J 1/007 297/195.1 |
| 2010/0253040 A1 * | 10/2010 | Lin | ............... | B62K 15/006 280/288.4 |
| 2012/0043148 A1 * | 2/2012 | Brady | ............... | B60L 3/0069 180/206.5 |
| 2015/0035326 A1 * | 2/2015 | Wong | ............... | B62J 1/28 297/195.1 |

FOREIGN PATENT DOCUMENTS

| | | |
|---|---|---|
| DE | 29716292 U1 | 1/1998 |
| DE | 20215136 U1 | 2/2003 |
| DE | 10253575 | 5/2004 |
| DE | 102011122836 | 7/2013 |
| EP | 0467541 A1 | 1/1992 |
| EP | 1995165 A2 | 11/2008 |
| EP | 1736402 B1 | 3/2010 |
| FR | 2876657 A | 4/2006 |
| JP | H09109960 | 4/1997 |
| JP | 2009190563 | 8/2009 |
| JP | 2010260457 A | 11/2010 |
| KR | 100768964 | 10/2007 |
| WO | 2006111590 A1 | 10/2006 |
| WO | 2011122738 A1 | 10/2011 |

OTHER PUBLICATIONS

Unknown author, "Frogsprung durch Technik", unknown publication date, retrieved from http://birdy-freunde.de/birdy/frog.html on Apr. 22, 2014.
Unknown author, "Past developments of Maderna Cycle Systems", unknown publication date, retrieved from http://mcsbike.com/?p=90/#d on Apr. 22, 2014.
YTdreamslide, Travelling sequences.mov. Video uploaded to Youtube on Jun. 5, 2010 and retrieved from http://www.youtube.com/watch?v=7W4vy8NvSbQ on Apr. 22, 2014.

* cited by examiner

Fig. 1

Detail A

Detail A

BICYCLE

TECHNICAL FIELD

The invention relates to a bicycle with a bicycle seat assembly rotatably connected thereto.

BACKGROUND

Bicycles typically comprise either a bicycle seat firmly connected with the bicycle or the bicycle frame, or the seat post of these bicycles is designed so that the bicycle seat is movable at most in and therewith without movement relative to the central reference plane of the bicycle, or the seat post and the saddle of the bicycle is pivotally connected to the seat tube. In one case the disadvantage of this arrangements is that the cyclist's position, riding seated, is significantly different from the standing riding position because of the bent posture. In the other case the disadvantage is that riding while standing is not possible, because the bicycle saddle hinders the riding while standing. An example of the last-mentioned disadvantage can be found in U.S. Pat. No. 1,381,281 A.

When using smaller wheels than 16 inches or 20 inches for the bicycles, the disadvantages concerning the handling characteristics of the bicycle have to be considered additionally in the evaluation of the prior art:

Small front wheels react faster to steering movements and tend to jiggle even at lower speeds and on slightly uneven terrain.

When cycling over obstacles (objects, holes, bumps on the road) with small wheels the steering movement can be severely impaired.

Due to the significantly reduced gyroscopic effect in bicycles with small wheels, riding while standing is in principle more unstable than on bicycles with large wheels.

Bicycles that are ridden while standing have the disadvantage that no seat apparatus is provided. This results in the disadvantage that the cyclist is supported only at two points on the bicycle namely with the feet on the pedals and with the hands on the handlebar. Since the cyclist has to bear his whole weight on these bicycles always by himself and for propulsion must also lift his entire weight upwards with every turn of the crank, the cyclist feels riding while standing more strenuous than a seated ride. When rolling and standing on the lower pedal with stretched leg while standing on the upper pedal with the other leg bent, the cyclist has to compensate the bicycle's lateral tilt towards the side of the stretched leg, which is triggered by the weight moment, by a holding force exerted on the handlebar side of the bent leg. When using small front wheels according to the above the directional stability is severely disturbed, especially during fast cycling and/or when cycling over obstacles. Examples can be found in: JP 2010 260 457 A, FR 2,876,657 A1, WO 2006/111590 A1, KR 100768964 B1, US 2004/0004341 A1, the bicycles micro slider and dreamslide of the company dreamslide, S. A. Bures-sur-Yvette, France and the bicycles MCS16" and "MCS across the city" of the company Maderna Cycle Systems, Vienna, Austria.

EP 1995165 A2 discloses a bicycle, ridden while standing and comprising a seat rotatably connected to the head tube, the main function of the bicycle seat is to steer the bicycle. Hence the bicycle seat is the steering device of the bicycle. The disadvantage of this is that for turning the cyclist has to move his hip to the side or must tilt the bicycle as a whole to the side. Hence riding while standing is exhausting, because the cyclist has to generate additional tensions between the bicycle seat and the waist or the hips in order to cause a deflection. The usual function of a bicycle seat as a support element for the cyclist's weight is therefore not given.

SUMMARY

An object of the invention is to develop a bicycle that reduces the above-mentioned disadvantages of bicycles ridden while standing and that offers a comfortable support for upright cycling. The features of claim 1 serve to achieve this object.

Furthermore the invention comprises further advantageous embodiments resulting from the dependent claims. The invention covers bicycles that are foldable so that a small folding size can be achieved for the entire bicycle.

The term "bicycle seat" used in the following description and in the claims covers all conceivable forms of supporting elements, on which the cyclist is supported to the bicycle by contact with his buttocks, i.e. his Regio glutealis, and/or by contact with his Regio sacralis.

The term "seating surface" used in the following description and in the claims covers those areas of the bicycle seat, that, while cycling, have contact with the cyclist's buttocks and/or Regio sacralis.

As used in the following description and in the claims the term "bicycle seat assembly" defines the part of the bicycle, which comprises the bicycle seat.

DETAILED DESCRIPTION

Figure 1:
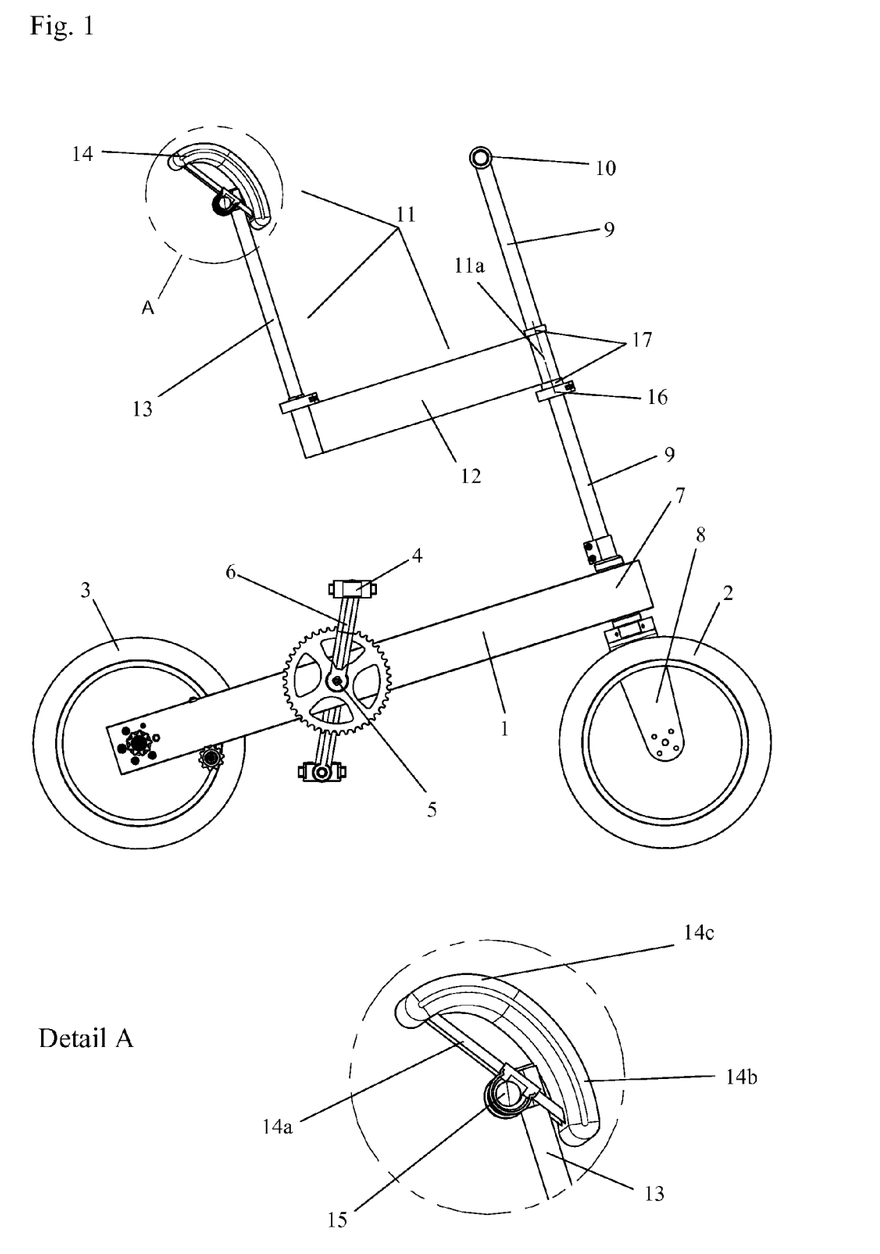
FIG. 1 shows the side view of a preferred embodiment of the bicycle with a bicycle seat assembly.

FIG. 1 shows a side view of a preferred embodiment of the bicycle. Illustrated is a bicycle with a bicycle frame 1, a front wheel 2 and a rear wheel 3. The rear wheel 3 is driven by means of pedals 4 by a bicycle drive, in this case by a chain drive with a bottom bracket 5, which is connected with cranks 6. Other bicycle drives with pedals, where the cyclist's feet move alternately up and down, are comprised by the invention.

The bicycle frame 1 has a head tube 7. In the head tube 7 the fork stem of a front fork 8 is rotatably supported. Above the head tube 7 the fork stem is connected to a steering column 9. The steering column 9 is firmly connected with the handlebar 10.

The cyclist rides the bicycle upright. The upright riding allows the cyclist to use his weight for propulsion and to take a back-relaxing riding posture. The handlebar 10 and the steering column 9 are arranged in front of the cyclist, seen in the driving direction. The handlebar 10 is arranged in such a height, that the cyclist's thighs have sufficient space below the handlebar 10.

The bicycle has a bicycle seat assembly 11, comprising a swing bar 12, a seat post 13 and a bicycle seat 14. According to a particular feature of the invention, the bicycle seat assembly 11 is rotatably connected to the bicycle by means of an axis of rotation 11a, wherein the axis of rotation 11a of the bicycle seat assembly 11 is arranged in front of the seating surface of the bicycle seat 14, seen in the driving direction, and wherein the rotational movement of the bicycle seat assembly 11 is possible to both sides of the central reference plane of the bicycle and is independent of the steering motion of the bicycle.

In the case of FIG. 1, according to a further feature of the invention the axis of rotation 11a of the bicycle seat assembly 11 is also arranged in front of the line, standing perpendicular to the ground plane and extending through the bottom bracket axle. In the case of FIG. 1, according to a further feature of the invention the bicycle seat assembly 11 is rotatably connected to the steering column 9. Seen in the driving direction, the rotatable connection between the steering column 9 and the swing bar 12 is arranged in front of the cyclist at the front end of the swing bar 12 via the axis of rotation 11a. According to a feature of the invention, the bicycle seat 14 is arranged behind the plumb line through the bottom bracket axle.

According to a feature of the invention, both the horizontal and the vertical position of the bicycle seat 14 can be changed. The bicycle seat 14 comprises struts 14a, which are connected with a commercially available saddle clamp 15, whereby the horizontal position of the bicycle seat 14 can be adjusted. Here, according to a feature of the invention the bicycle seat 14 is arranged behind the line, standing orthogonal to the ground plane and extending through the bottom bracket axle.

The swing bar 12 is arranged at a level which is usual for the top tubes of adult bicycles. The driver can thus stand on the ground between the handlebar 10 and the bicycle seat 14 without touching the swing bar 12.

In the following, the essential idea of the invention and the particular advantages of the bicycle with the rotatable bicycle seat assembly 11 will be explained:

Since the bicycle seat assembly 11 is rotatable to the side, the particular advantage results that the bicycle seat assembly 11 and thus the swing bar 12 and the bicycle seat 14 dodge the downward-pedaling leg and the hip side associated with this leg by a rotational movement to the side. This creates space for the leg of the cyclist, which is stretched to the lower pedal point. This allows the cyclist an upright riding position, whereas the bicycle seat 14 doesn't hinder the upright riding. Because the bicycle seat 14 moves towards the hip side of the non-stretched leg, the bicycle seat 14 displaces the hip side of the non-stretched leg forwards and upwards, causing the hip side of the non-stretched leg to raise and to support the cyclist in lifting his weight on the upper pedal 4. Simultaneously the cyclist is supported backward and downward by the bicycle seat 14 and doesn't need to bear his whole weight while riding upright.

Figure 2:
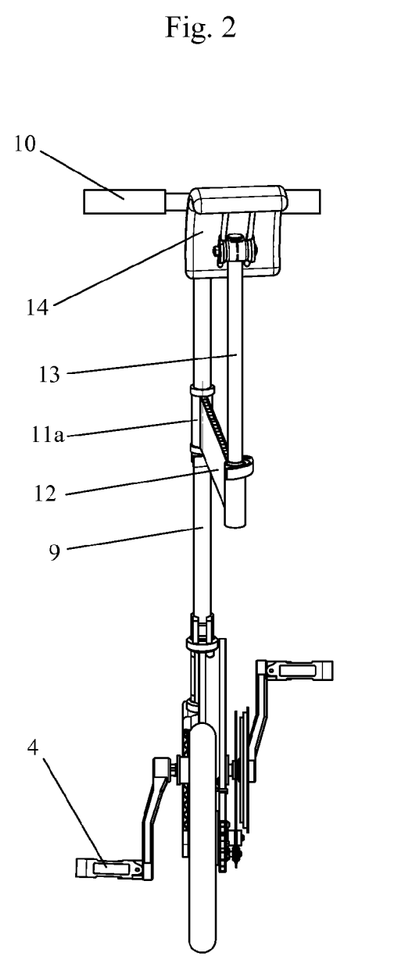
FIG. 2 shows the bicycle with the bicycle seat assembly of FIG. 1 in the rear view.
Figure 3:
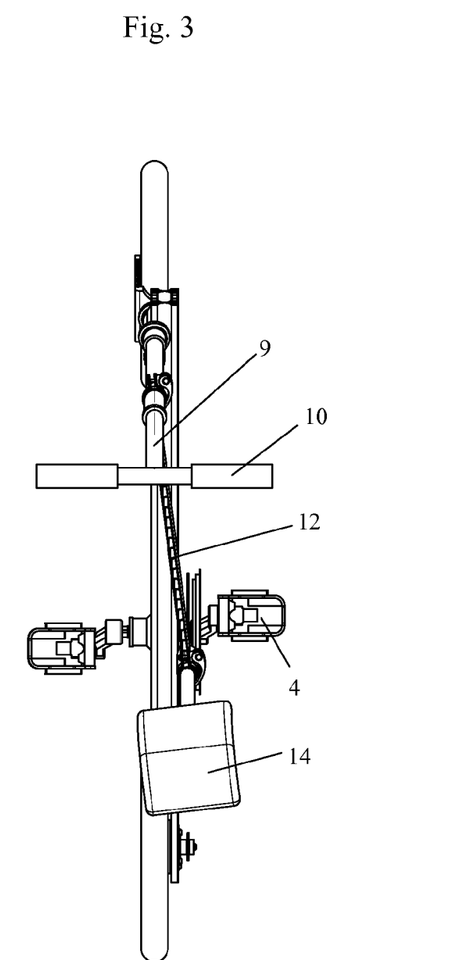
FIG. 3 shows the bicycle with the bicycle seat assembly of FIG. 1 in the top view.

FIGS. 2 and 3 show the view of the bicycle of FIG. 1 from behind and from above with the bicycle seat assembly 11 swiveled aside.

Rolling and standing on the lower pedal with stretched leg while standing on the upper pedal with the other leg bent, the cyclist's weight moment causes a tilt towards the side with the stretched leg which is compensated by the fact that the hip side with the non-stretched leg is supported by the bicycle seat 14. A compensation by a holding arm force exerted on the handlebar side of the bent leg is hardly necessary.

Because of the rotatable bicycle seat assembly 11 the cyclist, while pedaling, has to compensate the force acting backwards on the bicycle seat 14 by pressing arms and hands simultaneously forwards against the handlebar side of the stretched leg, because in the upright riding style the feet exert no or only a slight forward force on the pedal. As a result, via the swing bar 12 a tension is built up between the bicycle seat 14 and the handlebar 10 or the steering column 9, so that the small steering movements with small front wheels are stabilized and the wiggling of the small front wheels is reduced. Likewise, the force exerted forwards on the handlebar 10 results in a reduction or avoidance of the lifting tendency of the front wheel 2, which is certainly caused by the force acting backwards on the bicycle seat 14. For this reason, the bicycle seat assembly 11 can be used for bicycles with short horizontal distances between the rear-wheel axle and the bottom-bracket axle.

While pedaling with the legs, the bicycle seat 14 moves alternately on one and then on the other side. As a result of the above-mentioned effects, despite the upright riding the cyclist feels a comfortable and supported ride.

To achieve an optimal support, according to a further feature of the invention the horizontal distance between the seating surface of the bicycle seat 14 and the axis of rotation 11a of the bicycle seat assembly 11 is at least 30 cm and up to 60 cm. According to a further feature of the invention the distance between the axis of rotation 11a of the bicycle seat assembly 11 and the seating surface of the bicycle seat 14 should be at least 10 cm in order to obtain a supporting effect at all.

Depending on the selected position of the bicycle seat 14 the cyclist's feeling of riding while standing or of riding seated can predominate. If the bicycle seat 14 is positioned rather higher and more forward, the feeling to ride while standing predominates. If the bicycle seat 14 is positioned rather low and more backwards, the feeling to ride seated predominates.

According to a further feature of the invention, the cyclist can thus maintain an upright riding position and can adapt by the extent of support either a more seated or a more standing ride, respectively can adopt a more or less supported upright riding posture in relation to the bicycle seat 14.

For this purpose according to a feature of the invention the bicycle seat 14 has an outwardly curved seating surface, whereby the lower seating surface 14b, designed for supporting the cyclist's ride while standing, is less curved than the upper seating surface 14c of FIG. 1, designed for the seated ride.

Thus requirements resulting from the geometry and the translation of the bicycle, can be taken into account when adjusting the seat position. Bicycles with a short chain stay length, for example less than 25 cm, should be ridden more standing, otherwise the force acting backwards towards the bicycle seat 14 triggers a lifting of the front wheel 2 in case of a more powerful propulsion. The same applies to bicycles having a larger horizontal distance between the bottom bracket axle and the handlebar, for example more than 30 cm, because the pulling force of the arms on the handlebar acts more backwards than with shorter distances and thus the front wheel 2 could lift up in case of a more powerful propulsion. The same applies to the transmission of the bicycle drive. At low meters of development of the bicycle drive, in this embodiment the distance per crank revolution, a more standing ride can be preferred by the cyclist to avoid lifting the front wheel 2 in case of more powerful propulsion.

The cyclist can even increase the support of the bicycle seat 14 by exerting an additional forward-facing pressure on the handlebar 10 with his arms and his hands. This leads to a body tension between the handlebar 10 and the bicycle seat 14, so the cyclist can also perform very fast pedaling, which would otherwise compromise the control of the bicycle because of the rapidly changing load transfer to the pedals 4. To achieve this function, according to a further feature of the invention the horizontal distance between the seating surface of the bicycle seat 14 and the handlebar 10 is at least 30 cm and up to 60 cm.

Since the bicycle seat 14 always moves aside towards the supported hip side, the bicycle seat 14 can be made very narrow.

According to a further feature of the invention, seen in the driving direction, a backwardly acting bending moment on the steering column 9 is induced by the weight and/or by the force-induced pressure on the bicycle seat 14, in particular in case of more seated ride. If the steering column 9 has an appropriate stiffness and elasticity, the bending moment results in a small elastic deformation of the steering column 9 towards the back. The particular advantage of this deformation is that the steering movement is made more difficult due to the deformation, because during turning the steering column 9 around its own axis by the cyclist or because of irregularities of the terrain, the deformation must be overcome in addition to enable the rotation of the steering column 9. Thus, the steering movements when turning small front wheels are stabilized and the jiggling of the small front wheels is reduced. The farther above the swing bar 12 and thus the bicycle seat assembly 11 is rotatably connected to the steering column 9, the higher is the achieved deformation and the higher is the stabilizing effect.

The bicycle seat assembly 11 can be connected rotatably or pivotally to the steering column 9 by a plurality of embodiments covered by the invention. In FIG. 1, for example, a clamp connection 16 positions the height of the rotatable bicycle seat assembly 11 at the steering column 9. In this case, the bicycle seat assembly 11 can be seated directly on the clamp connection 16 or can be mounted to the steering column 9 and to the clamp connection by means of a suitable bearing arrangement, for example by means of a head set, that bears the swing bar 12 to the steering column 9 at the top and at the bottom.

The steering column 9 could simply comprise a shaft shoulder, on which the bicycle seat assembly 11 is rotatably seated.

Figure 4:
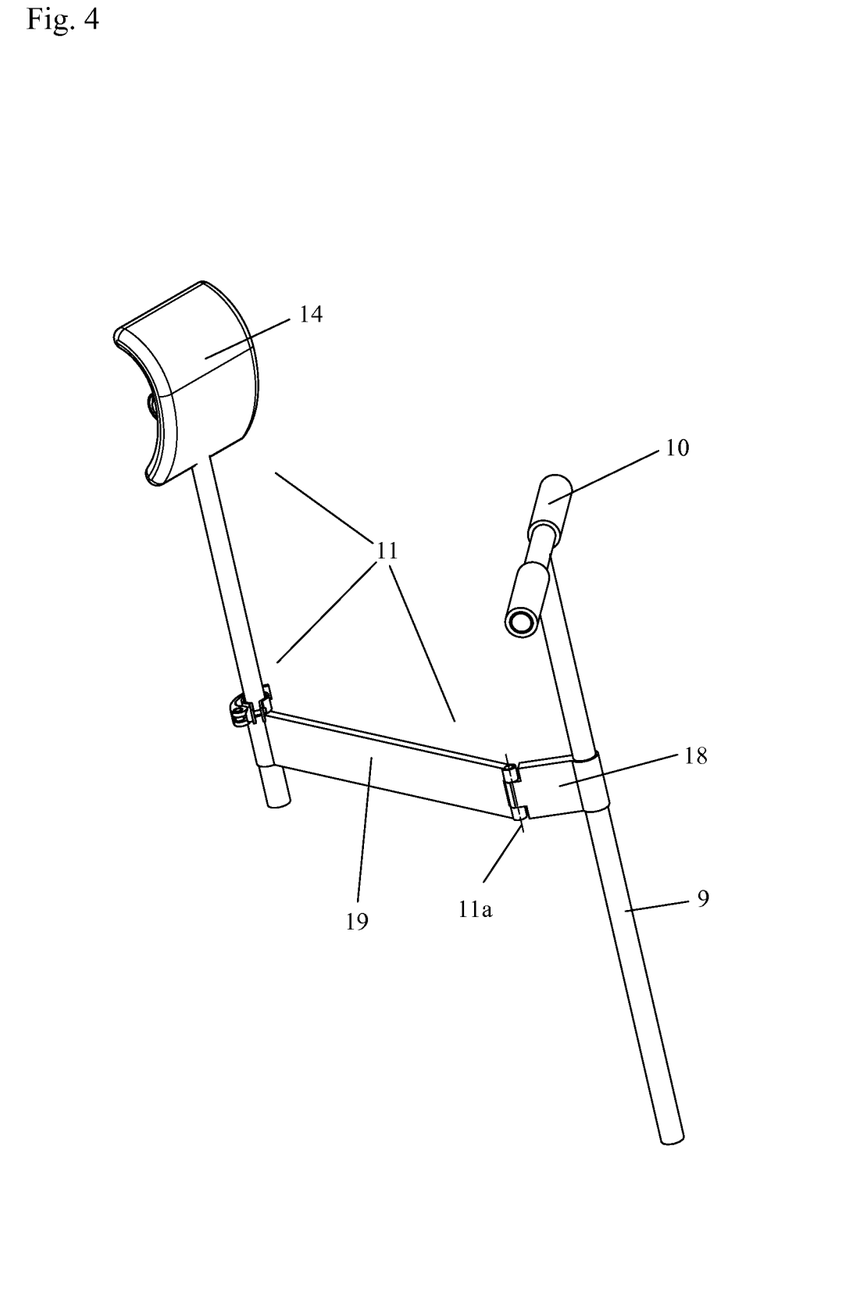
FIG. 4 shows a second preferred embodiment of the bicycle with a bicycle seat assembly having an eccentric axis of rotation.

FIG. 4 shows a second embodiment of the bicycle, wherein according to a particular feature of the invention the axis of rotation 11a of the bicycle seat assembly 11 is arranged behind the axis of rotation of the steering column 9. The steering column 9 is initially connected with a rear-facing hinge 18 or comprises it. The bicycle seat assembly 11, which in turn comprises a swing bar 19 and the bicycle seat 14, is rotatably connected to the hinge 18 via the axis of rotation 11a. This arrangement has the particular advantage that especially at longer distances between the steering column 9 and the bicycle seat 14, the axis of rotation of the bicycle seat assembly 11 is displaced backwards, seen in the driving direction, whereby on one side the pivot angle and thus the space for the stretched leg and the support for the hip side of the non-stretched leg is enlarged. On the other hand, the steering movement is somewhat difficult during cornering, because the axis of rotation 11a has to be rotated against the weight force of the cyclist, tilted towards the curve. This in turn facilitates the directional stability of bicycles with small wheels and reduces the tendency of the small wheels to jiggle.

Figure 5:
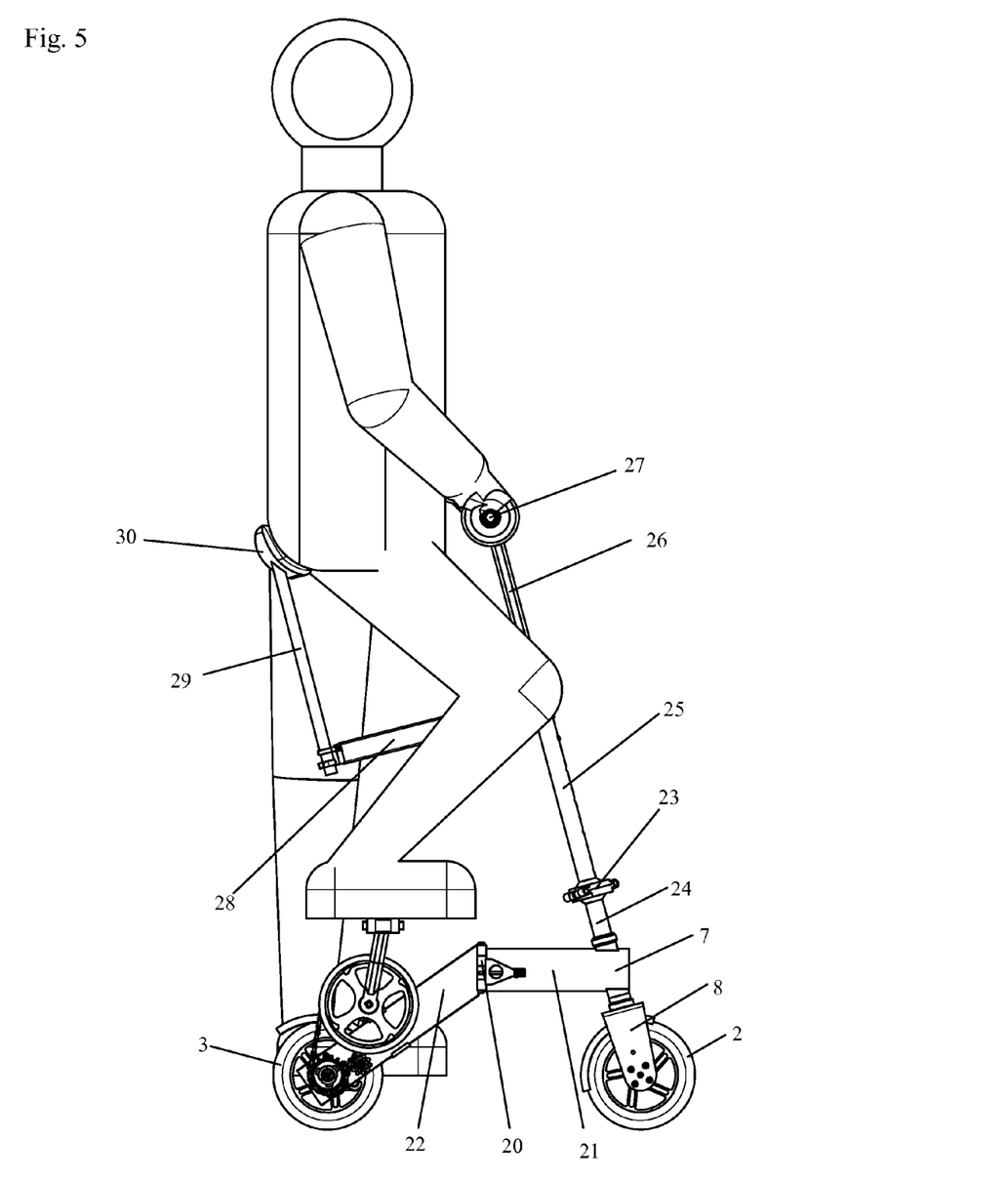
FIG. 5 shows a view of a very compact embodiment of the bicycle, shown in detail in DE 10 2011 122 836, to which a further embodiment of the bicycle seat assembly is mounted.

FIG. 5 shows a view of a very compact bicycle, illustrated in detail in DE 10 2011 122 836, which is ridden by a man who is 2.0 m tall, and to which the bicycle seat assembly is mounted, rotatably to the steering column. To avoid repetition, concerning the bicycle without the bicycle seat assembly, reference is made to the publication DE 10 2011 122 836, which is hereby incorporated by reference.

A folding hinge 20 connects a front frame part 21 with a rear frame part 22 of the bicycle.

A further folding hinge 23 connects a lower hinge 24, which is connected to the fork stem via a clamping connection, with an upper hinge, which is adapted to a lower steering column 25. An upper steering column 26 is linearly displaceably arranged in the lower steering column 25. The upper steering column 26 is connected with a handlebar 27.

The bicycle seat assembly comprises a swing bar 28, a seat post 29 and a bicycle seat 30. The entire assembly is rotatably connected to the bicycle at the front end of the swing bar 28 via the axis of rotation 11a.

Figure 6:
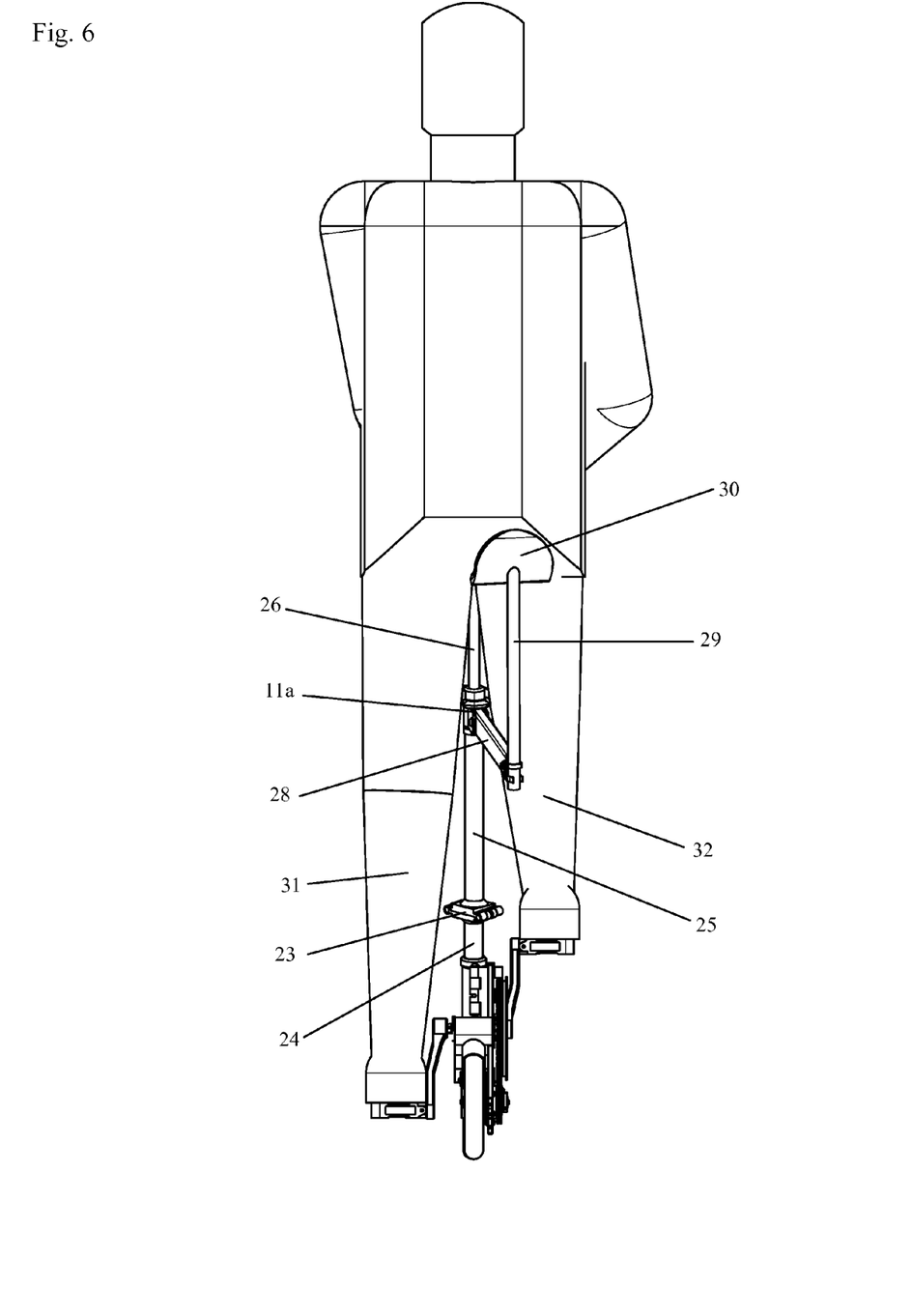
FIG. 6 shows a view of the bicycle of FIG. 5 from the rear.

FIG. 6 shows a rear view of the bicycle shown in FIG. 5. This view clearly shows the bicycle seat assembly dodging the cyclist's downward-pedaling leg 31 and moving towards the side of the cyclist's bent leg 32, whereby the bicycle seat 30 supports the hip side of the bent leg 32.

Figure 7:
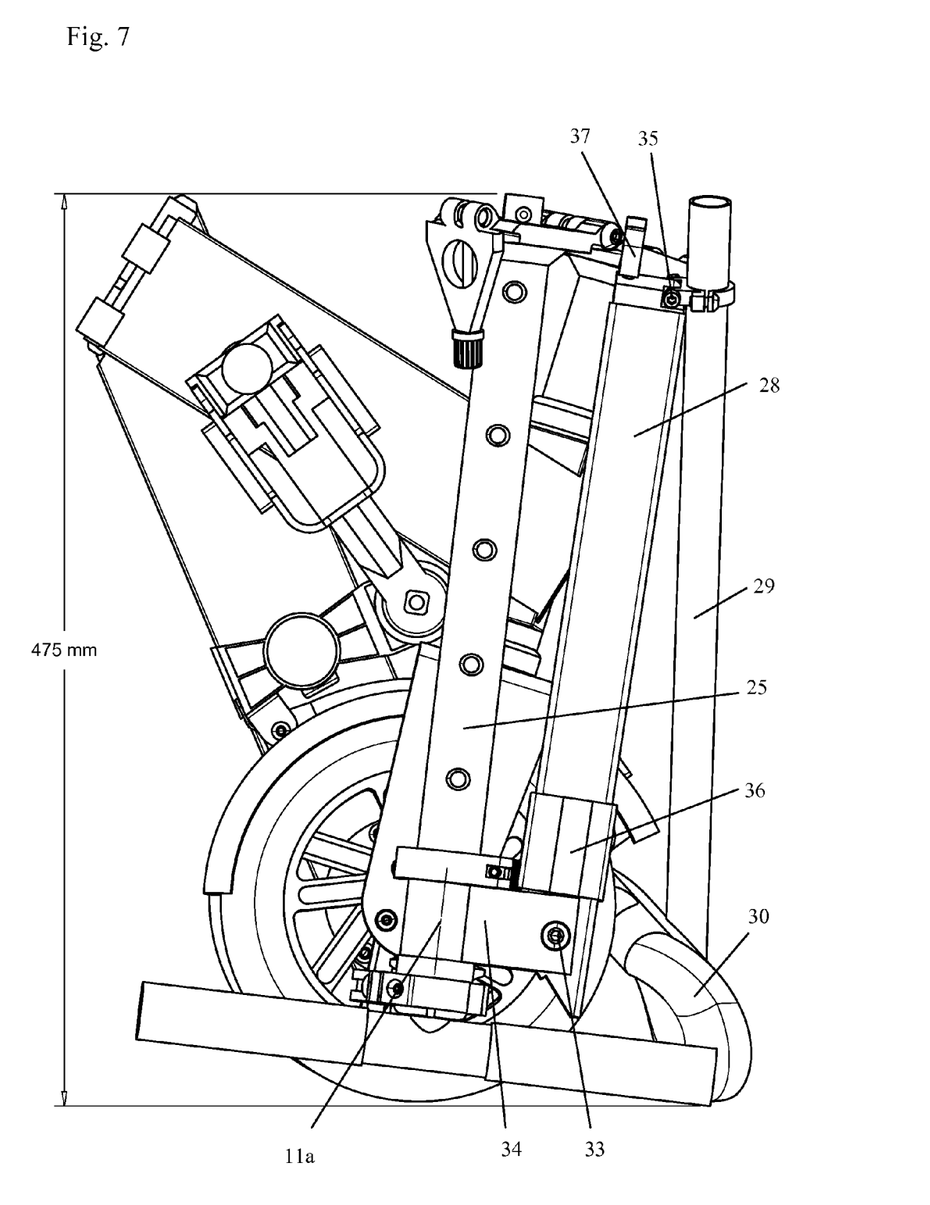
FIG. 7 and FIG. 8 show two views of the bicycle of FIG. 5 in the folded state.

FIG. 7 shows a side view of the bicycle of FIG. 5 in the folded state. The swing bar 28 is pivotally connected via an axis 33 to a bracket 34, which is rotatably mounted to the steering column 25 via the axis of rotation 11a of the bicycle seat assembly. Swing bar 28 and seat post 29 are rotatably connected via an additional axis 35. In the folded state of the bicycle, according to a particular feature of the invention, the swing bar 28 and the seat post 29 are folded approximately along the lower steering column 25 and along the major length of the folding size of the folded bicycle by means of axles 33 and 35. According to a particular feature of the invention the maximum length of the folding size of the bicycle of FIG. 5 is thus only 47.5 cm or less than 55 cm.

Additional to FIG. 7 possible examples of fixing the swing bar 28 and the seat post 29 are shown in the unfolded state. While a sliding sleeve 36 is displaced from the swing bar 28 onto the bracket 34 in the unfolded state, the seat post 29 is held in its position in the unfolded state by a clamp 37.

Figure 8:
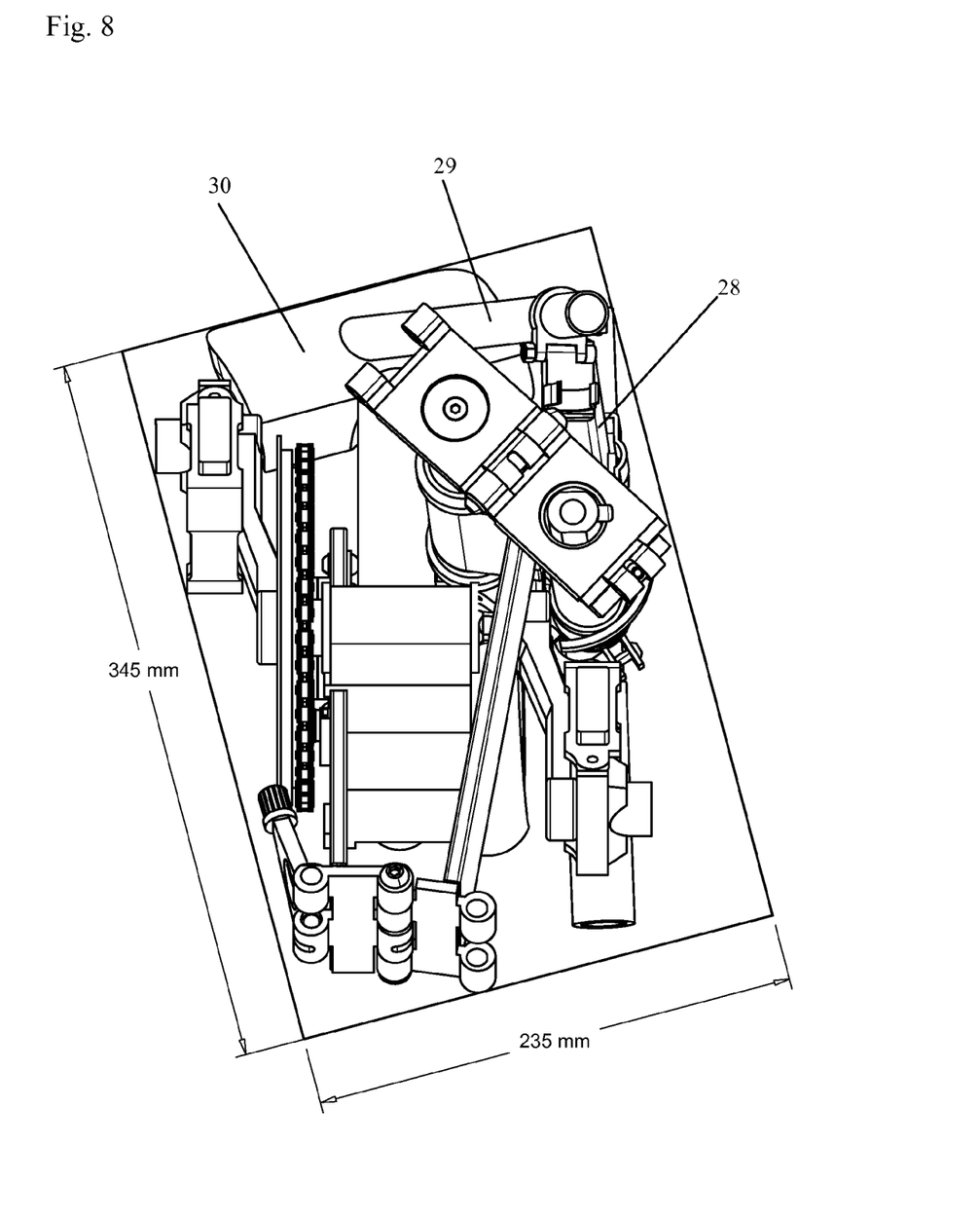

FIG. 8 shows the view of the bicycle of FIG. 5 in the folded state from above. With a folded width of 34.5 cm and a folded depth of 23.5 cm, according to a particular feature of the invention, the sum of the length, the width and the depth of the folding size amounts to at most 115 cm and thus fulfills, regarding the measurements, the board luggage regulations of numerous airlines.

Figure 9:
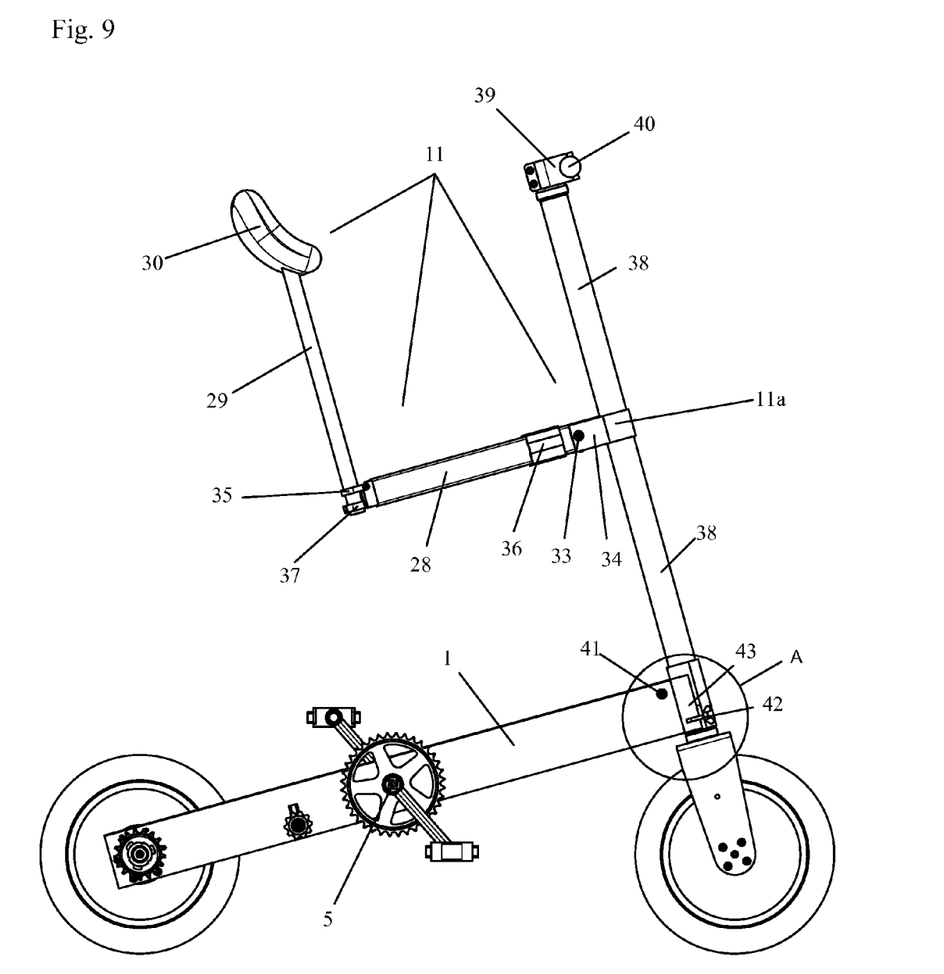
FIG. 9 shows the side view of another embodiment of the bicycle with a bicycle seat assembly mounted to a head tube.

FIG. 9 shows a side view of another embodiment of the bicycle. According to a further feature of the invention, the bicycle seat assembly 11 is rotatably connected to the bicycle via an extended head tube 38.

At the upper end of the head tube 38 a commercially available standard handlebar stem 39 connects the fork stem with a handlebar 40.

According to a further feature of the invention, in this embodiment the head tube 38 is pivotally connected to the frame 1 via an axis 41. A screw connection 42 braces the head tube 38 with a dropout 43 of the frame 1. To this end a round nut 44 is mounted pivotally to the dropout 43 and a wing nut 45 clamps the round nut 44 with the help of a thread 46, connecting round nut 44 and wing nut 45.

Figure 10:
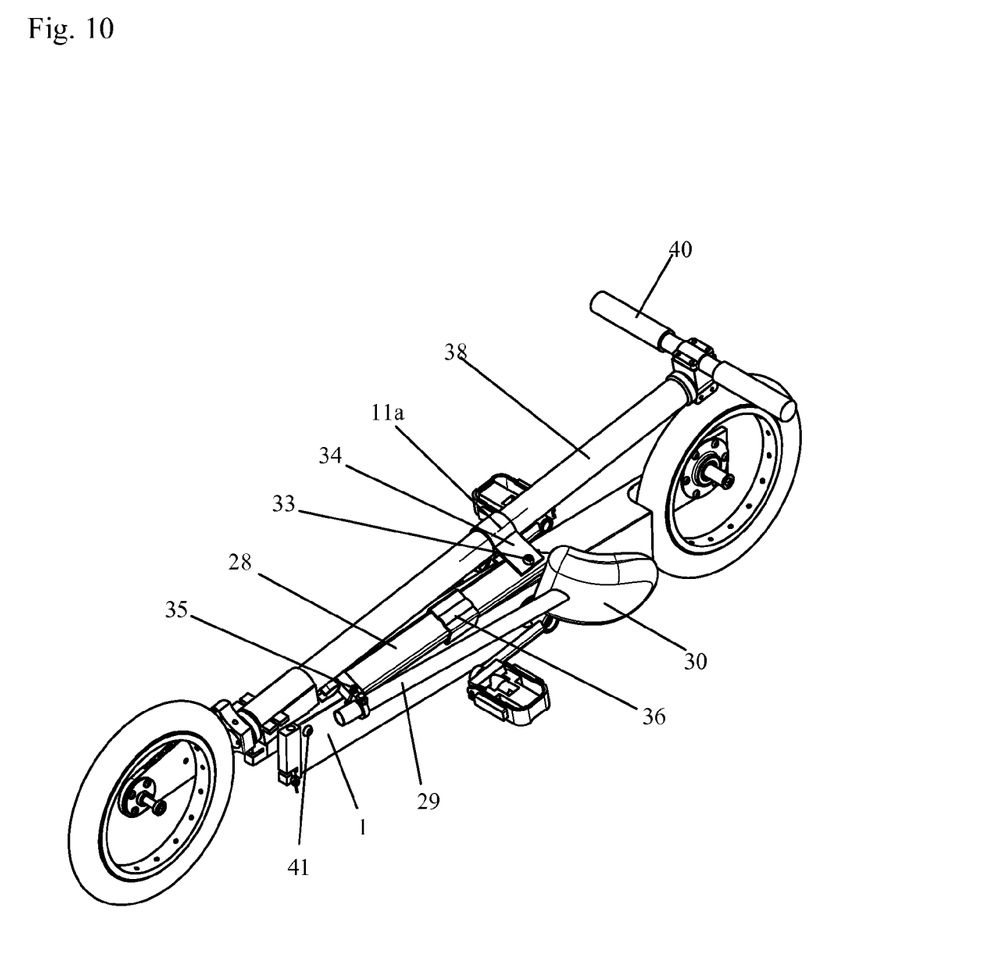
FIG. 10 shows the side view of the bicycle of FIG. 9 in the folded state.

By this arrangement, according to a further feature of the invention, the head tube 38 and the elements of the bicycle seat assembly may be longitudinally folded to the frame 1 at an angle of at most 15°. FIG. 10 shows the folded state of the bicycle of FIG. 9. The particular advantage of this embodiment is that the bicycle can be folded very quickly and can be realized very compact in folded width and folded depth because of the bicycle seat assembly 11 turned aside via the axis of rotation 11a.

Figure 11:
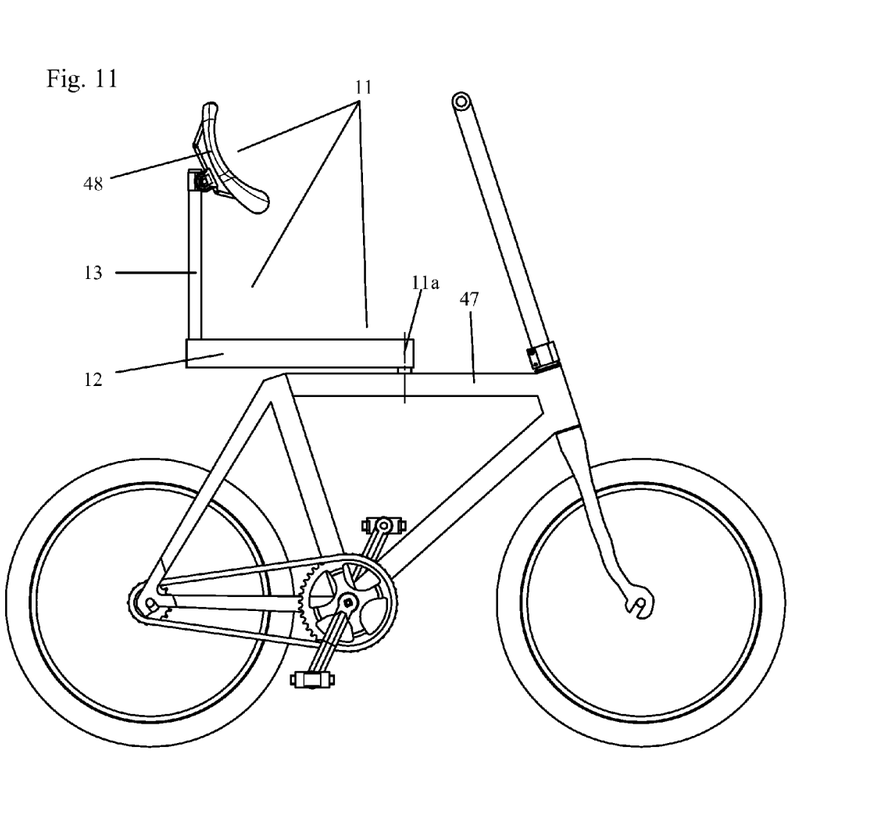
FIG. 11 shows the view of a further embodiment of the bicycle with a bicycle seat assembly mounted to the bicycle frame.

FIG. 11 shows the side view of another embodiment of the bicycle. According to a further feature of the invention the bicycle seat assembly 11 is connected rotatably to a bicycle frame 47.

Figure 12:
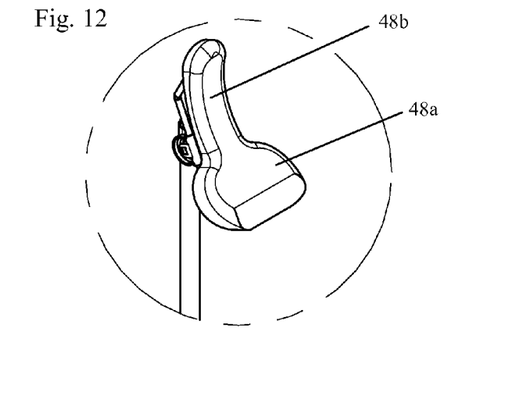
FIG. 12 shows the saddle of the bicycle seat assembly of FIG. 11.

FIG. 12 shows the bicycle seat of the bicycle seat assembly of FIG. 11. According to a further feature of the invention, the bicycle seat assembly 11 comprises a bicycle seat 48 with a wider, lower seating surface 48a, on which the cyclist can sit each with bent leg, and a smaller, upper support surface 48b, on which the cyclist can be supported with his Regio sacralis. The advantages of this bicycle seat 48 are that for producing, the production processes in mold-making of commercially available bicycle seats can be used or need to be modified only slightly and that the riding while standing feels particularly comfortable with this form and arrangement of the bicycle seat 48.

Also comprised by the invention are embodiments, in which the bicycle seat is only designed as an upwardly pointing rod, to which only the cyclist's coccyx and/or Regio sacralis is supported.

Essential in all embodiments is that the axis of rotation 11a of the bicycle seat assembly 11 is arranged in front of the seating surface of the bicycle seat (14, 30, 48) and ideally in front of the bottom bracket 5, seen in the driving direction, whereby the described supporting effect for the upright riding will only be achieved.

The invention claimed is:

1. A bicycle, comprising:
   a bicycle frame having a head tube;
   a front wheel which is rotatably connected around a front axle to a front fork, the front fork comprising one or more fork blades and being rotatably mounted to the head tube;
   a rear wheel having a rear axle;
   a handlebar for steering the front wheel;
   a steering column connecting the handlebar to the front fork;
   a bicycle drive for driving the rear wheel, comprising a bottom bracket and two pedals which are configured to be pedaled downwards alternatingly by a cyclist, wherein pedaling down one of the two pedals simultaneously moves up the other of the two pedals; and
   a bicycle seat assembly, comprising a bicycle seat, wherein the bicycle seat assembly is rotatably connected to the bicycle via an axis of rotation and wherein the axis of rotation of the bicycle seat assembly is arranged in front of a seating surface of the bicycle seat, wherein the axis of rotation of the bicycle seat assembly is arranged in front of the axle of the bottom bracket and
   wherein the seating surface of the bicycle seat is arranged behind the axle of the bottom bracket, and
   wherein the bicycle seat assembly is connected to the bicycle frame via the head tube and/or via the steering column.

2. The bicycle as in claim 1, wherein the bicycle frame comprises a folding hinge pivotally connecting a front frame part and a rear frame part with each other around a pivot axis, the pivot axis being arranged approximately midway between the front axle and the rear axle and approximately orthogonal to a ground plane, and wherein the rear wheel and the front wheel are, in a folded state of the bicycle, arranged laterally one behind the other largely congruently.

3. The bicycle as in claim 2, wherein in a folded state of the bicycle the rear frame part, the front frame part, and the front fork form sides of a triangle.

4. The bicycle as in claim 1, wherein above the head tube a folding hinge is arranged, that folds a mono- or multi-part steering column and the handlebar.

5. The bicycle as in claim 4, wherein the steering column comprises a lower steering column and an upper steering column, which are folded laterally beside the front wheel in a folded state of the bicycle.

6. The bicycle as in claim 1, wherein in a folded state of the bicycle the sum of the length, the width, and the depth of the bicycle does not exceed 115 cm.

7. The bicycle as in claim 1, wherein the bicycle seat assembly is rotatably connected to the bicycle frame via the steering column.

8. The bicycle as in claim 1, wherein weight acting on the bicycle seat causes a bending moment which makes steering movement more difficult.

9. The bicycle as in claim 1, wherein the axis of rotation of the bicycle seat assembly is arranged behind the steering column.

10. The bicycle as in claim 1, wherein the bicycle seat assembly is connected to the bicycle via the head tube and rotatably to the head tube.

11. The bicycle as in claim 10, wherein a folding hinge is arranged between the head tube and the bottom bracket, folding the head tube and the handlebar via an axis.

12. The bicycle as in one of claim 1, wherein the bicycle seat assembly comprises a swing bar, a seat post, and a bicycle seat that are folded laterally beside a steering column and/or beside the head tube in a folded state of the bicycle.

13. The bicycle as in claim 1, wherein the axis of rotation of the bicycle seat assembly is arranged at least 10 cm in front of the seating surface of the bicycle seat.

14. The bicycle as in claim 1, wherein the horizontal component of a distance between the handlebar and the bicycle seat is at least 30 cm and at most 60 cm, whereby the cyclist is able to exert a forward-facing pressure on the handlebar with the hands and can be supported backwards to the bicycle seat.

15. The bicycle as in claim 1, wherein the horizontal component of a distance between the axis of rotation of the bicycle seat assembly and the bicycle seat is at least 30 cm and at most 60 cm, whereby a sufficient rotation of the bicycle seat assembly for supporting a hip side of the cyclist's leg that is not pedaling downward is achieved.

16. The bicycle as in claim 1, wherein the bicycle seat is an upwardly pointing rod, which supports the cyclist's Regio sacralis and/or coccyx.

17. The bicycle as in claim 1, wherein the bicycle seat comprises a lower seating surface and an upper seating surface, wherein the lower seating surface is wider than the upper seating surface.

18. A bicycle, comprising:
a bicycle frame having a head tube;
a front wheel rotatably connected to a front fork;
a handlebar;
a steering column extending through the head tube and connecting the handlebar to the front fork; and
a bicycle seat assembly rotatably connected to the steering column,
wherein the bicycle seat assembly is connected to the steering column separately from the bicycle frame.

19. The bicycle as in claim 18, wherein the bicycle seat assembly can rotate about an axis of rotation which is coaxial with the steering column.

20. The bicycle as in claim 18, further comprising a rear-facing hinge which is fixedly connected to the steering column, wherein the bicycle seat assembly is connected to the rear facing hinge and can rotate about an axis of rotation which is rearward of the steering column.

* * * * *